United States Patent [19]

Narumiya et al.

[11] Patent Number: 4,967,409
[45] Date of Patent: Oct. 30, 1990

[54] NETWORK SYSTEM OF PROGRAMMABLE CONTROLLERS

[75] Inventors: Masao Narumiya; Toshimi Kiyohara, both of Nara, Japan

[73] Assignee: Sharp Kabushiki Kaisha, Osaka, Japan

[21] Appl. No.: 404,112

[22] Filed: Sep. 7, 1989

Related U.S. Application Data

[60] Division of Ser. No. 346,723, May 3, 1989, which is a continuation of Ser. No. 240,428, Sep. 1, 1988, abandoned, which is a continuation of Ser. No. 40,747, Apr. 20, 1987, abandoned, which is a continuation of Ser. No. 730,298, May 3, 1985, abandoned.

[30] Foreign Application Priority Data

| May 11, 1984 | [JP] | Japan | 59-95438 |
| May 11, 1984 | [JP] | Japan | 59-95439 |
| May 11, 1984 | [JP] | Japan | 59-95440 |
| May 30, 1984 | [JP] | Japan | 59-11743 |
| Jun. 4, 1984 | [JP] | Japan | 59-11307 |

[51] Int. Cl.[5] .......................... H04J 3/02; H04J 3/24
[52] U.S. Cl. ............................ 370/085.600; 370/94.1
[58] Field of Search ................ 370/60, 60.1, 85.1, 370/85.6, 85.7, 94.1, 94.2, 85.15; 340/825.5, 825.51

[56] References Cited

U.S. PATENT DOCUMENTS

| 4,312,065 | 1/1982 | Ulug | 370/94.2 |
| 4,500,987 | 2/1985 | Hasegawa | 370/85.6 |
| 4,726,019 | 2/1988 | Adelmann et al. | 370/60 |

Primary Examiner—Douglas W. Olms
Assistant Examiner—Wellington Chin
Attorney, Agent, or Firm—Flehr, Hohbach, Test, Albritton & Herbert

[57] ABSTRACT

Data receiving-and-transmitting stations are connected in a ring-shaped network, each transmitting data packets normally in the order in which they are received. Each station can identify a high-priority data packet and is programmed to transmit a high-priority data simutaneously with the normal-priority data packet which has been to be transmitted next according to the order in which it was received.

5 Claims, 8 Drawing Sheets

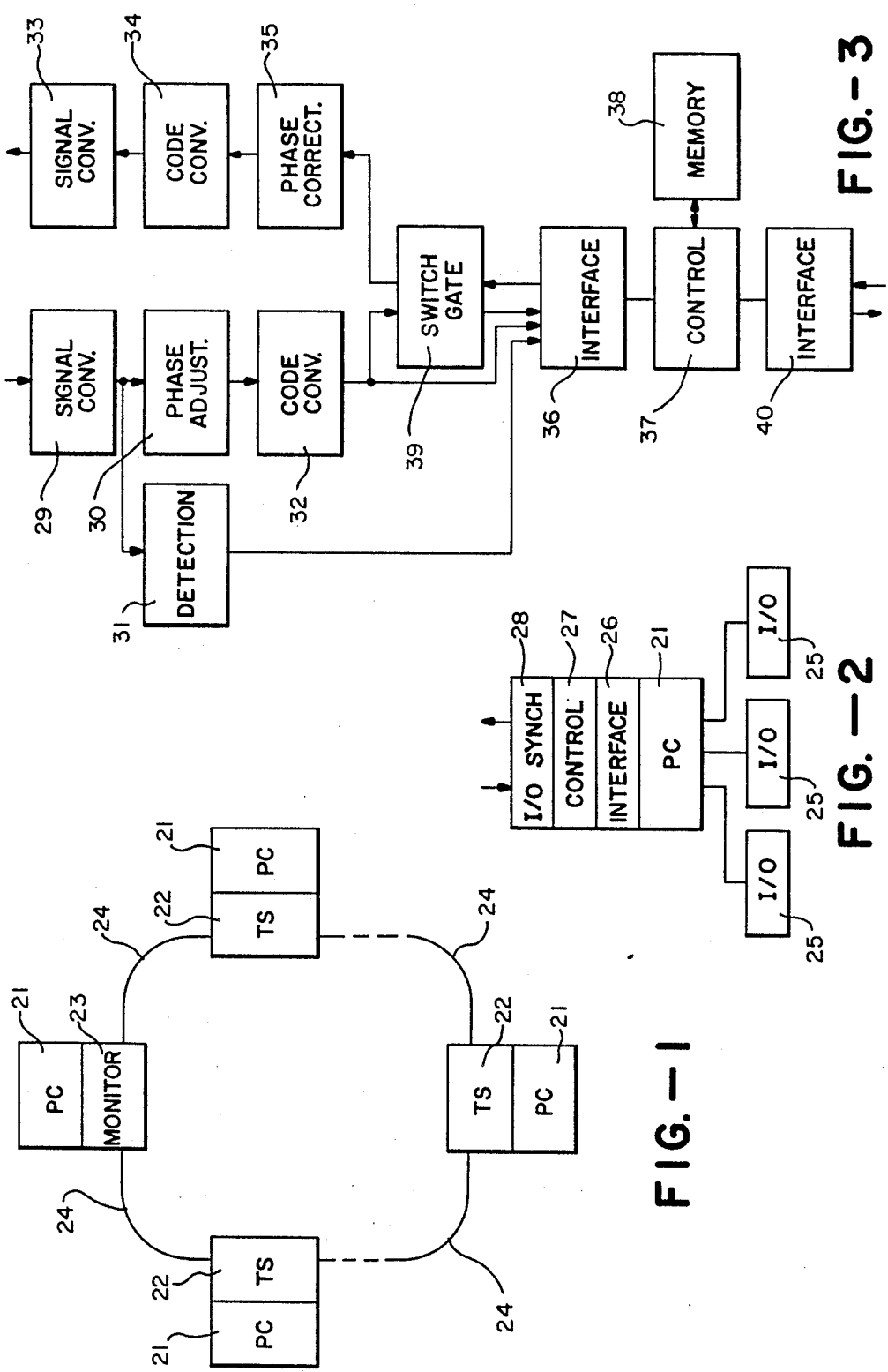

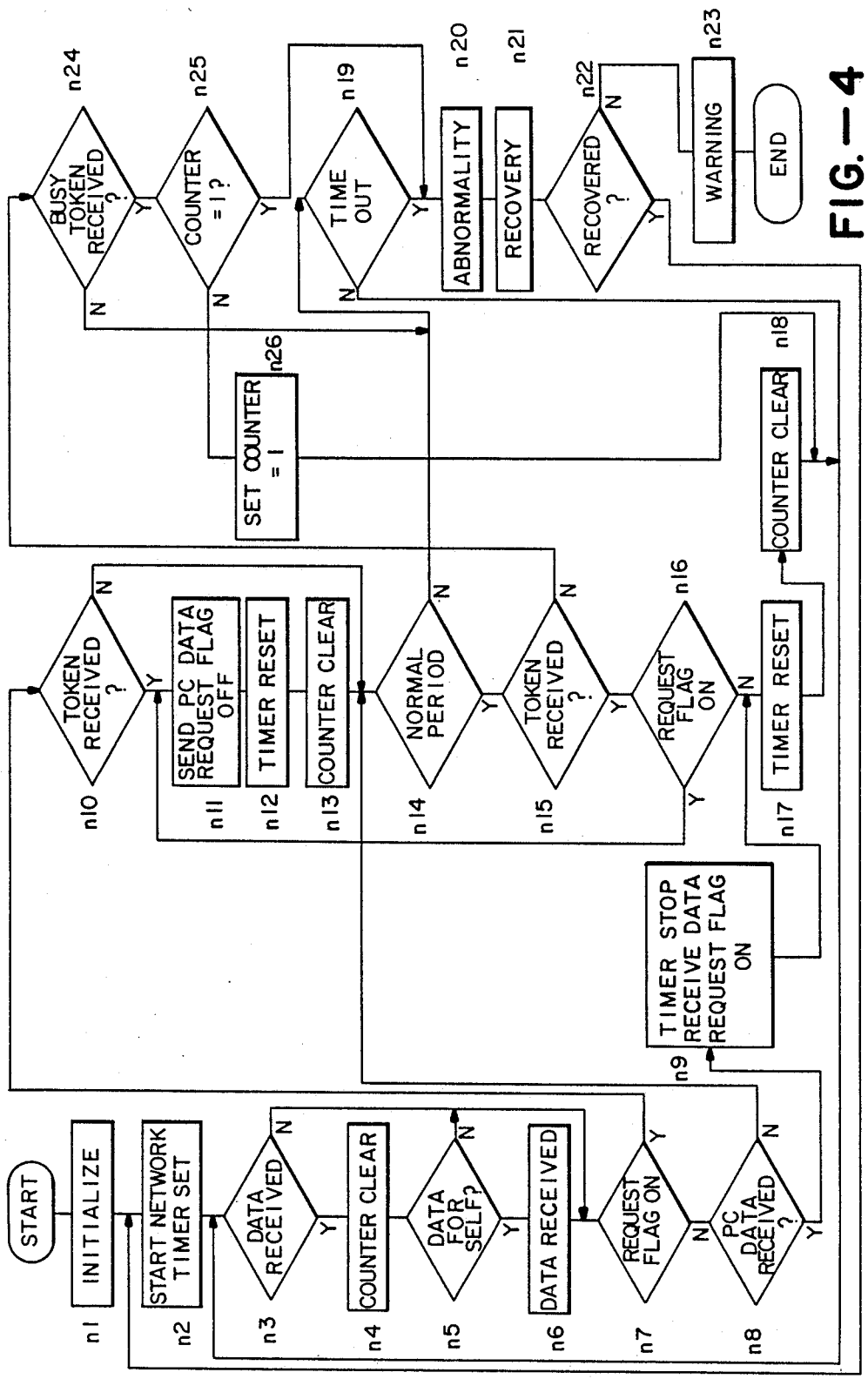
FIG.—4

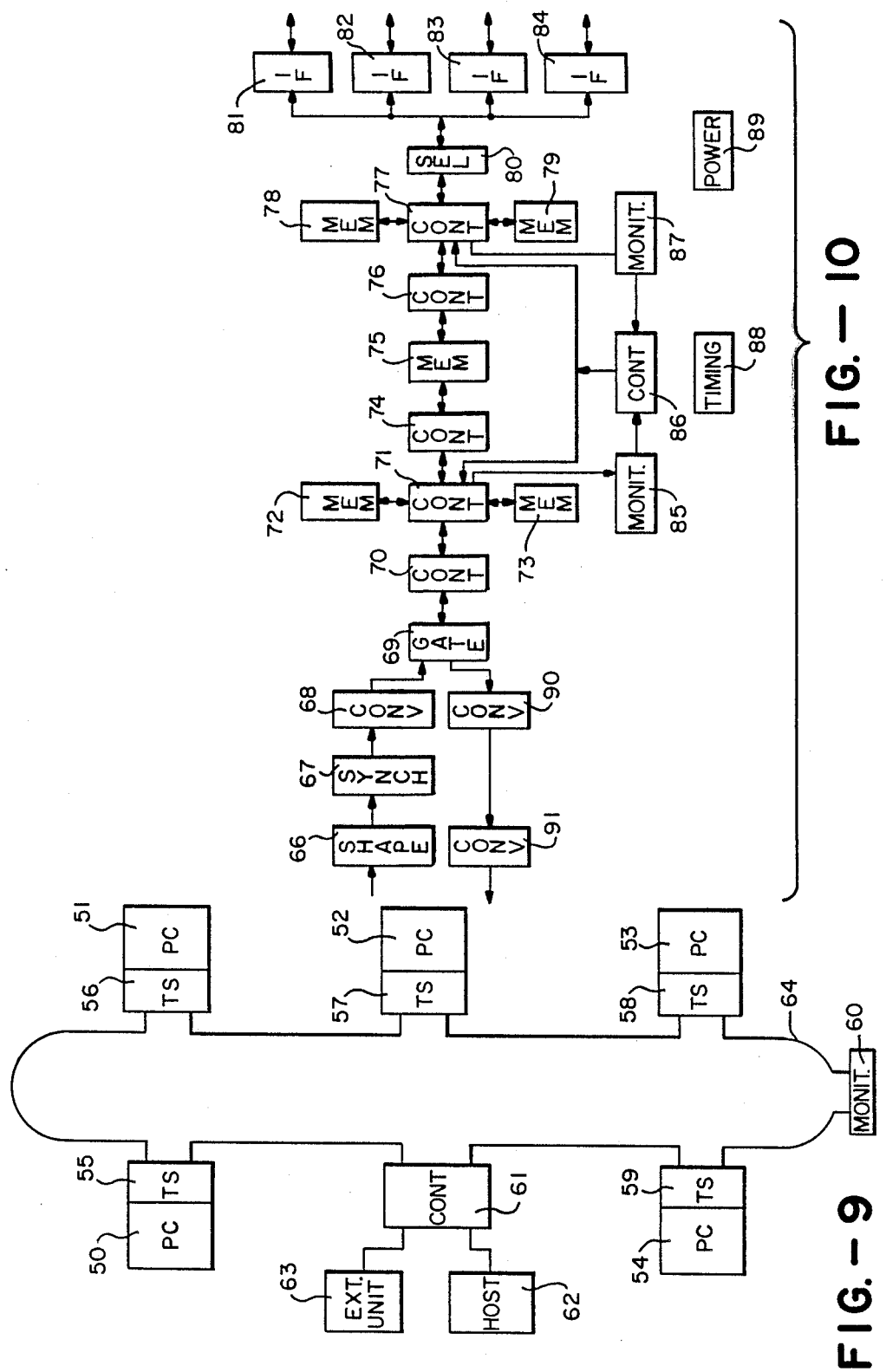

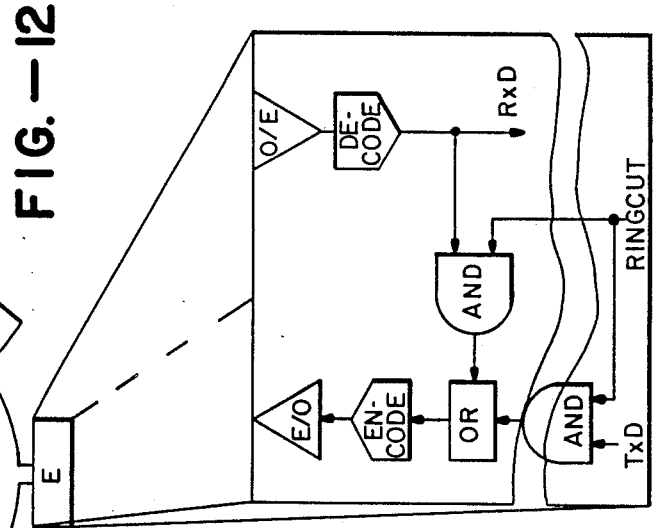
FIG.—12
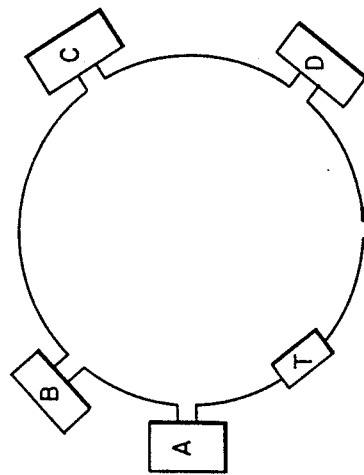
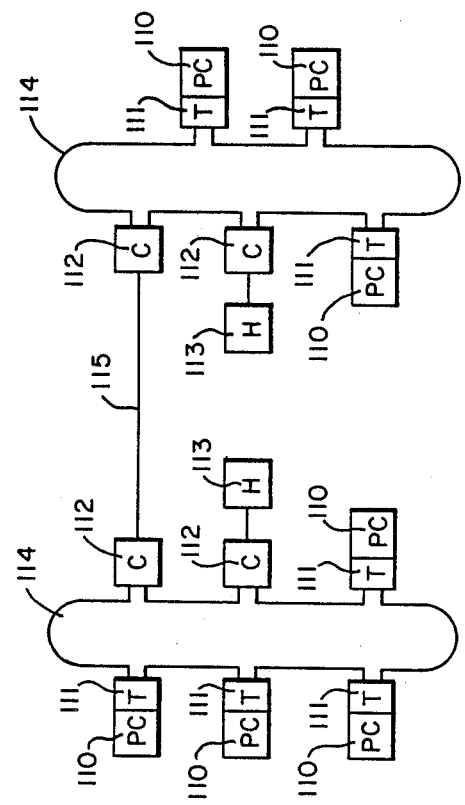
FIG.—11

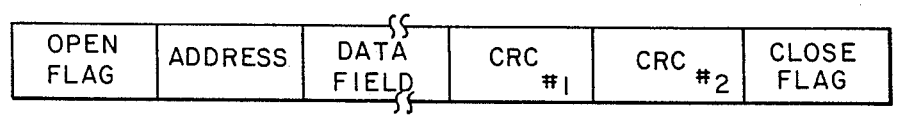
FIG.—13a
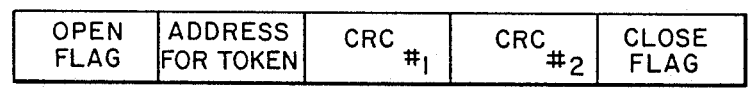
FIG.—13b
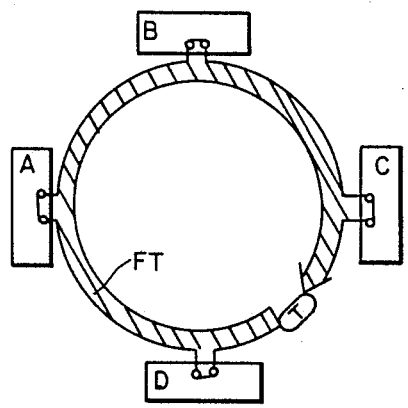
FIG.—14a
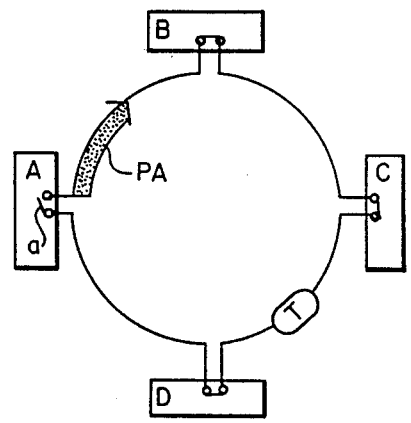
FIG.—14c
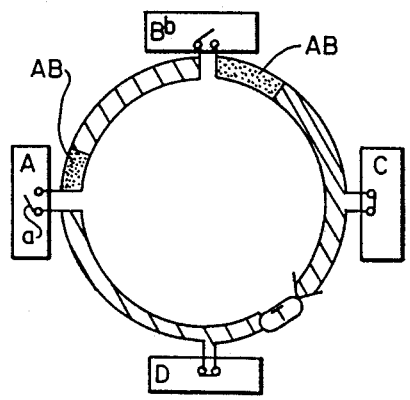
FIG.—14b
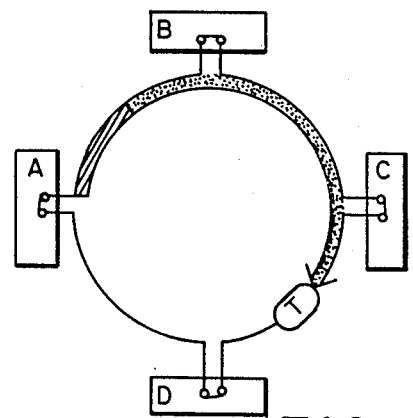
FIG.—14d

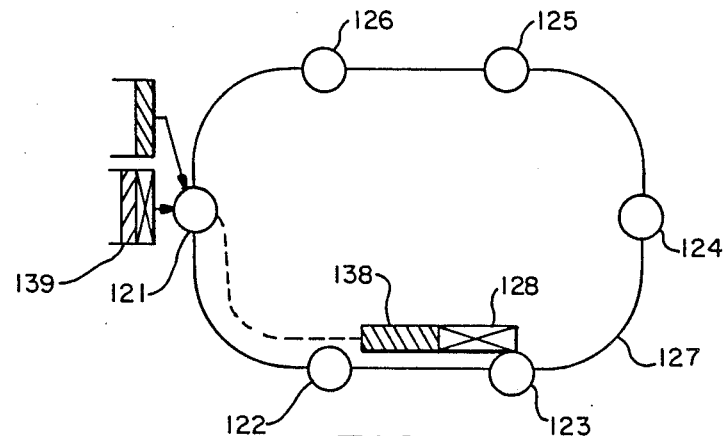
FIG.—15
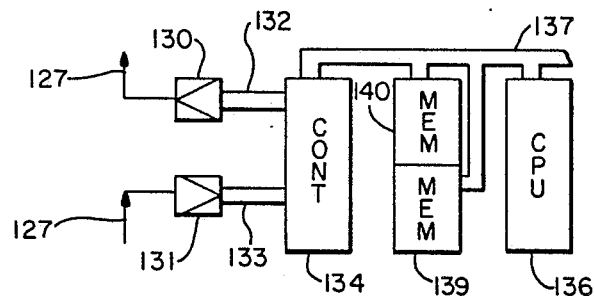
FIG.—16
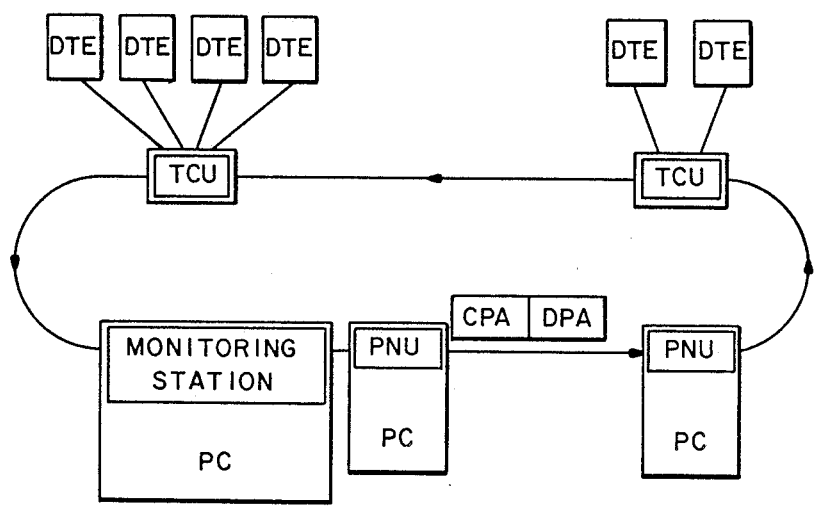
FIG.—17

NETWORK SYSTEM OF PROGRAMMABLE CONTROLLERS

BACKGROUND OF THE INVENTION

This invention relates to network systems of programmable controllers and more particularly to a method of efficient data transmission in a system having a plurality of transceiver stations connected to form a ring-like network.

A local area network system of programmable controllers generally comprises a plurality of programmable controllers linked by optical fibers or the like so that data can be transmitted among such programmable controllers situated within relatively short distances. Such systems are useful, for example, for the automation of production lines in a factory.

SUMMARY OF THE INVENTION

It is therefore an object of the present invention to provide a ring-shaped data transmission system with improved transmission efficiency.

The above and other objects of the present invention can be achieved by providing a transmission system with data receiving-and-transmitting stations connected in a ring-shaped network, each transmitting data packets normally in the order in which they are received. Each station can identify a high-priority data packet and is controlled to transmit a high-priority data simultaneously with the one which has been to be transmitted next among the normal-priority data packets according to the order in which they were received.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a diagram showing generally a network system of programmable controllers according to the present invention.

FIG. 2 shows how a programmable controller is connected in the network system of FIG. 1.

FIG. 3 is a block circuit diagram of a transceiver station adapted to perform the functions of a monitoring station.

FIG. 4 is a flow chart for the transceiver station of FIG. 3.

FIG. 9 shows a loop-type network system of programmable controllers connected to a computer and another external unit through a transfer control station.

FIG. 10 is a block circuit diagram of the transfer control station shown in FIG. 9.

FIG. 11 shows a method of connecting two network systems of the type shown in FIG. 9.

FIG. 12 shows the structure of a loop transmission system of this invention.

FIGS. 13(a) and 13(b) show examples of message and token formats used in the transmission system shown in FIG. 12.

FIGS. 14(a)-(d) are for explaining the basic operation pattern of the transmission system shown in FIG. 12.

FIG. 15 shows another embodiment of the loop transmission system according to the present invention.

FIG. 16 is a circuit diagram of a station for the loop transmission system of FIG. 15.

FIG. 17 shows a network system of programmable controllers according to the embodiment of FIG. 15.

DETAILED DESCRIPTION OF THE INVENTION

Figure 6:
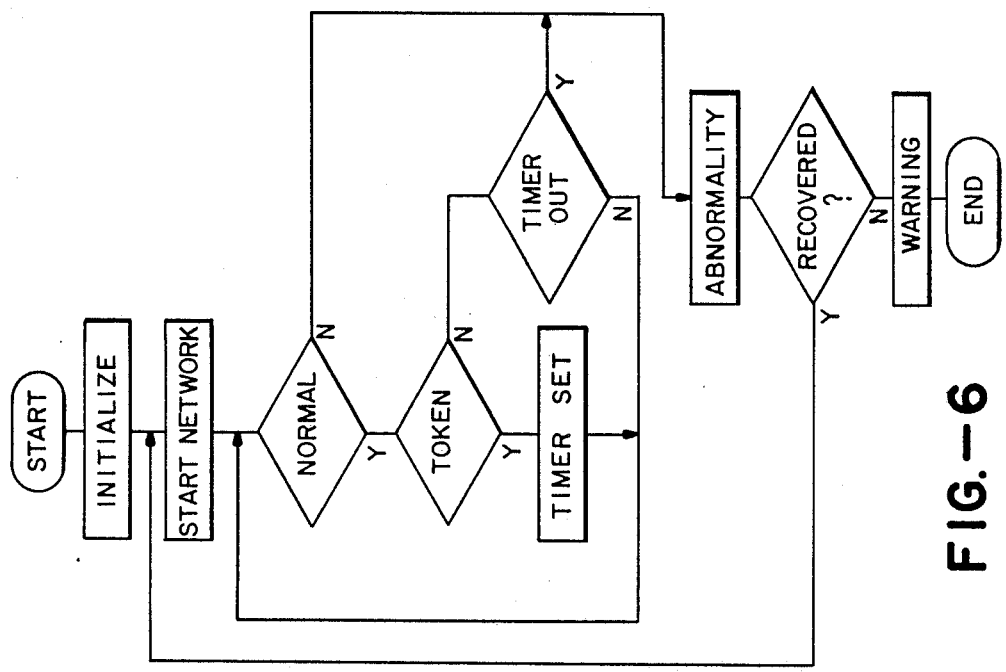
FIG. 6 is a flow chart for the monitoring station of FIG. 5.

FIG. 1 generally shows a network system of programmable controllers to which the present invention relates. The network comprises a plurality of programmable controllers (PC) 21 connected in a loop (or ring) formation by transmission lines 24 of plastic or quartz optical fibers. Numeral 21 indicates a transceiver station (TRANS. STAT) for transmitting and receiving data signals. Numeral 23 is a transceiver station (MONITOR) having additional functions of a monitoring station such as the initializing and starting of the network, detection of abnormal situations, display, recording and communication. Each programmable controller 21 may be connected to input/output units 25 (I/O UNIT) and to the network as shown in FIG. 2 through an interface 26 (INTERFACE), a control means 27 (CONTROL) and an input/output synchronization circuit 28 (I/O SYNCH).

Figure 5:
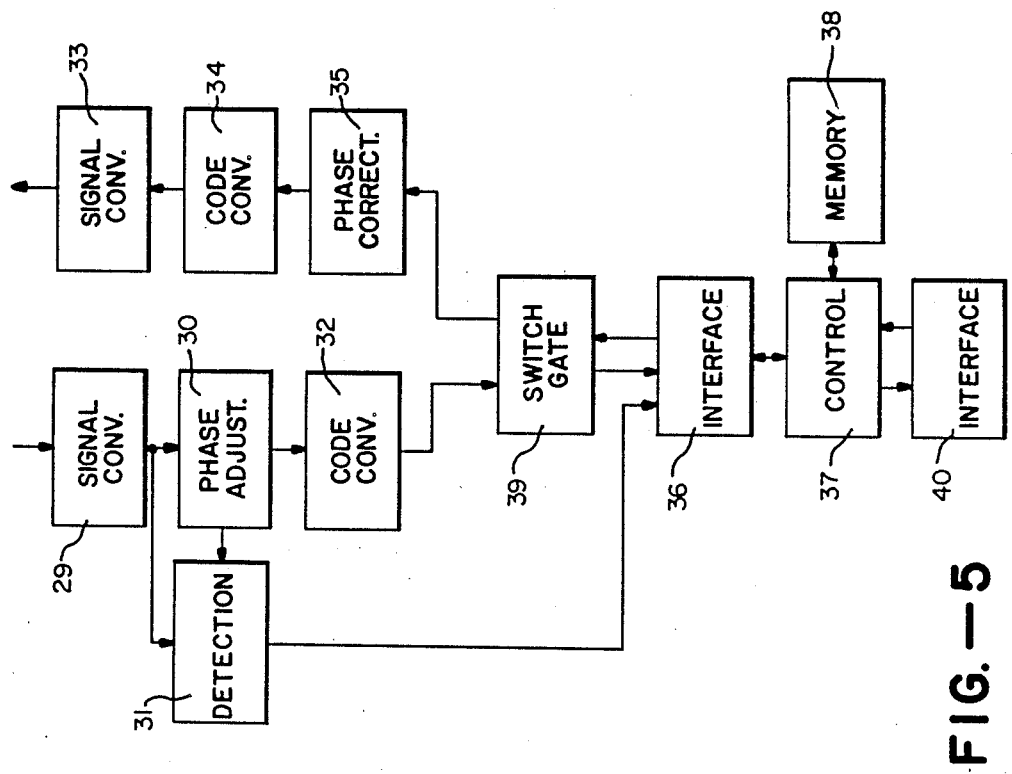
FIG. 5 is a block circuit diagram of a monitoring station.
Figure 7:
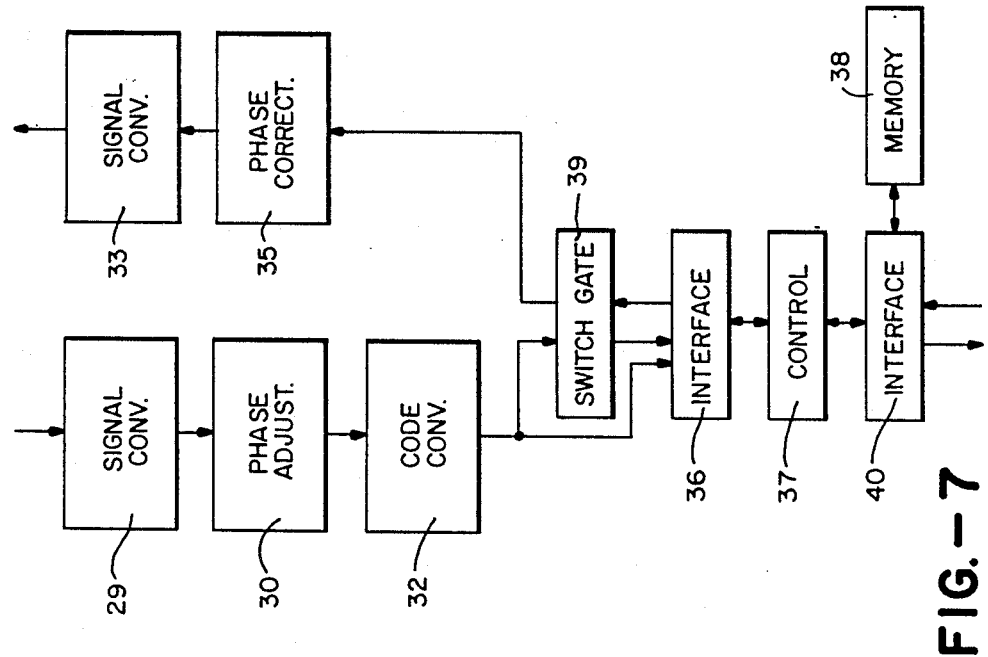
FIG. 7 is a block circuit diagram of a transceiver station in the network of FIG. 1.

In FIG. 3 which is a block circuit diagram of the transceiver station 23 of the present invention, numeral 29 indicates a signal conversion circuit (SIGNAL CONV) for converting optical signals into electrical signals and numeral 30 indicates a phase adjustment circuit (PHASE ADJUST) for adjusting the phases of input and output signals including DPLL. Numeral 31 is a detection circuit (DETECTION) for checking the conditions of input signals by making use of the property that a Manchester code signal never stays on the same level if its frequency is greater than the transmission frequency. Numeral 32 is a code conversion circuit (CODE CONV) for converting the Manchester code into the NRZ code. Numeral 33 is a signal conversion circuit (SIGNAL CONV) for converting electrical signals to optical signals. Numeral 34 is a code conversion circuit (CODE CONV) for converting the NRZ code into the Manchester code, numeral 35 is a phase correction circuit (PHASE CORRECT), numeral 36 is an interface circuit (INTERFACE) for sending data outputted from a memory means 38 (MEMORY) by a control means 37 (CONTROL), etc. to the network by following a predetermined routine and receiving signals from the network, numeral 39 is a switch gate circuit (SWITCH GATE) for sending signals from the code conversion circuit 32 to the phase correction circuit 35 and from the interface circuit 36 to the phase correction circuit 35 in response to a control signal from the interface circuit 36 and the control means 37, and numeral 40 is an interface circuit (INTERFACE) for controlling the transmission and reception signals with the programmable controller. FIG. 3 should be compared with FIG. 7 which is a block circuit diagram of the transceiver station 22 without the additional functions of a monitoring station. Components therein which are similar to those in FIG. 3 are indicated by like numerals. In summary, the transceiver station 23 according to the present invention includes the detection circuit 31 and the phase correction circuit 35 in addition to the components of a conventional transceiver station 22. In other words, the transceiver station 23 of the present invention is so structured that it can monitor and control the network which used to be the responsibility of a monitoring station in convention network systems. Output signals from the switch gate circuit 39 are applied to the phase correction circuit 35 because the delay time in a ring-shaped network as a whole is not always an integral multiple of the transmission signal and a correction may be necessary. FIG. 5 is a block circuit diagram of a conventional monitoring station. Components therein which are similar to those in FIG. 3 are again indicated by like numerals.

The transceiver station 23 of the present invention is adapted to perform primarily the functions of an ordinary transceiver station of the conventional type when communication is being carried out normally. In the case of an abnormality, however, it is adapted to perform primarily the functions of a monitoring station such as to initialize the network. Even when communication is proceeding normally, this station is adapted to keep checking for abnormalities in the signals being received.

Operation of this transceiver station 23 will now be explained by way of a flow chart shown in FIG. 4. When power is switched on, both the station itself and the network are initialized (n1). When this is completed, a control word for allowing transmission to the network is sent, a timer is set for checking the time interval at which the right to transmit is received, and the network is activated (n2). The signal, or message, representing this right to transmit will be referred to sometimes as the "token" or "free token".

Subsequently, when a data signal is received (n3), a signal is transmitted to indicate that the right to transmit, or the token, has been captured and the counter for counting reception frequency is cleared (n4). The signal which indicates that the right to transmit has been captured will be referred to as the "busy token". It is then determined whether the data signal which has been received is for this station (n5). If so, it is accepted and processed (n6). The request flag is checked (n7) and if it is OFF and there is a data signal from the programmable controller 21, it is accepted (n8), the request flag is set to ON (n9) and the system proceeds to the step n17. If it is determined that the data signal is not from the programmable controller 21 in the step n8, on the other hand, the system proceeds to the step n14. If the request flag is ON in the step n7, the system proceeds to the step n10 and waits for the token. When it is received, the data signal from the programmable controller 21 is transmitted. When this is done, the request flag is set to OFF (n11), the token is returned to the network, the aforementioned timer is set again (n12), and the aforementioned counter is cleared (n13).

Next, it is examined whether the period of the transmission signal is normal or not (n14). Although this step is executed even when the received data signal was not from the programmable controller 21, the system proceeds to the steps n19–n21 in the case of an abnormality, recording it in the memory and displaying it on the display unit of this controller, and executes a recovery routine. If recovery cannot be achieved (n22), this is recorded in the aforementioned memory of the controller and a warning to this effect is issued by means, for example, of a speaker (n23).

If it is decided normal in the step n14, the system waits until the token is received. When it is received (n15), the request flag is checked (n16) and if it is OFF, the aforementioned timer is set again (n17), the counter is cleared (n18) and the system returns to the step n2. If it is decided in the step n15 that the token has not been received, it is checked whether the busy token has been received. It is then examined whether the counter is set to "1" or not. If not, the counter is set to "1" and the system returns to the step n2. If the counter is set to "1", on the other hand, the system proceeds to the step n20. In other words, the network is monitored for abnormalities by checking whether the token can be received within a predetermined time period or whether the busy token is not received twice in a row because the busy token has the property of becoming extinguished after traveling around the ring once.

In summary, no monitoring station is independently installed in the network according to the present invention. Instead, the network monitoring and control functions are carried out by one of the transceiver stations linked to a programmable controller. The following advantages can be derived from such a design.

Firstly, initial values for the individual transceiver stations can be set at the monitoring station before communication is established by using the input unit of a programmable controller. Secondly, even if communication has failed due to an accident, the input unit of the aforementioned controller can be used to report the accident. Thirdly, both the output unit and the memory unit of the aforementioned controller can be used for the display, warning and recording of a transmission abnormality. Fourthly, since the input/output unit and the recording unit of the programmable controller can be used, input to the monitoring station, storage and output of the contents of a transmission abnormality, etc. can be placed under the control of a controller program. In other words, input/output and storage can be controlled by a controller program so that the system structure and procedures can be simplified. Fifthly, a very inexpensive network can be established since no dedicated input/output units or memory devices are required.

Figure 8:
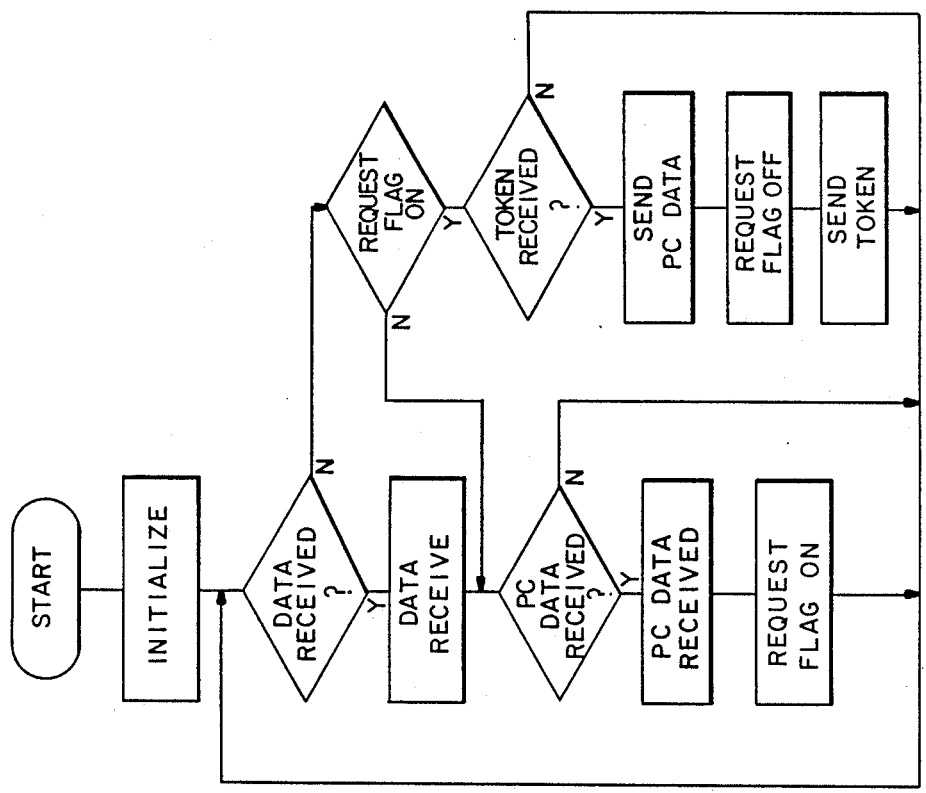
FIG. 8 is a flow chart for the transceiver station of FIG. 7.

FIG. 6 is a flow chart of the monitoring station of FIG. 5. FIG. 8 is a flow chart of the transceiver station of FIG. 7.

A network of the type described above can communicate with an external unit such as a host computer. A method of establishing such communication is illustrated in FIG. 9 wherein programmable controllers (PC) 50 through 54 are connected respectively to transceiver stations (TS) 55 through 59 which are connected as shown through plastic or quartz optical fibers 64 with a monitoring station (MONIT) 60, and a transfer control station (CONTR) 61. Numeral 62 indicates a host computer (HOST) Numeral 63 represents a unit to be externally connected (EXT. UNIT) such as a CRT, a printer or a bar code reader. The transceiver stations 55 through 59 are adapted not only to exchange data signals with the other controllers through this network but also to receive and read control signals from the host computer 62 and to send response signals back. The monitoring station 60 is adapted to initialize network communications and to check the transmission conditions and may be installed independently in the network as shown in FIG. 9 or incorporated into one of the transceiver stations as done in the example of FIG. 1.

The transfer control station 61 is for the purpose of easily and effectively connecting a host computer and a unit like a CRT, a printer or a bar code reader to a ring-type network shown in FIG. 1 through a standard interface means. As shown in detail in FIG. 10, it comprises an input signal waveform shaping means (SHAPE) 66 which includes a signal conversion circuit for converting an optical input signal into an electrical signal, an input signal phase synchronization means (SYNCH) 67 provided with a PLL circuit, a code conversion means (CONV) 68 for converting a Manchester code into an NRZ code, an input/output control means (CONT) 70 adapted to perform important functions such as making decisions regarding input signals, checking errors in input signals and outputting output signals according to formats, an output signal selection gate means (GATE) 69 for selection on the basis of a control signal from the input/output control means 70 whether an input signal should be outputted directly or it should be erased and new data should be outputted, a control means (CONT) 71 for input/output signals, a program memory means (MEM) 72 of the aforementioned control means 71, a data memory means (MEM) 73 for temporarily storing input/output data and results of computations, a control circuit means (CONT) 74, a memory means (MEM) 75 for temporarily storing in an orderly manner according to a predetermined routine data from programmable controllers to a computer as well as control commands and data from the host computer to the programmable controllers, a control circuit means (CONT) 76, a control means (CONT) 77 for changing communication procedures and for controlling the input/output through standard interface means 81 through 84 including control circuits and output signal driver circuits, a program memory means (MEM) 78 for the aforementioned control means, a data memory means (MEM) 79, a selection circuit means (SEL) 80 for the aforementioned standard interface means (IE) 81 through 84, a monitoring means (MONIT) 85 containing a watch dog timer for the control means 71, an abnormality signal control means (CONT) 86 for making decisions regarding the signals from the aforementioned monitoring means 85 as well as the monitoring means (MONIT) 87 of the control means 77, a timing means (TIMING) 88 for controlling the clock and timing signals of the transfer control station as a whole, a power source means (POWER) 89 of the transfer control station 61 of FIG. 9, a code conversion means (CONV) 90 for converting an NRZ code into the Manchester code, and an output signal conversion means (CONV) 91 for converting electrical signals into optical signals.

For the purpose of convenience in explaining the operation of the network of FIG. 9, let us define station addresses in a clockwise direction so that the monitoring station 60 has #0 as its address, the address of the transceiver station 59 is #1, that of the transfer control station 61 is #2, etc. The address CH.1 will be assigned to the computer 62 connected to the transfer control station 61 and CH.2 to the other unit 63.

First, the network is initialized from the monitoring station 60 and a free token is issued subsequently so that communication becomes possible with all stations. Let us assume now that there was a change in the input to the controller 52 and that its results are transmitted to the controller 50. In this situation, the controller 52 initially communicates with the transceiver station 57 and makes a request. In response, the transceiver station 57 catches the token which is traveling around the loop and converts it into a busy token, thereby denying the right to transmit from the other stations. It then takes in the data from the controller 52, edits the data message, for example, into the following HDLC format.

7E 06 0A Data CRC1 CRC2 7E and sends it to the transceiver station 55. The transceiver station 55, when it receives the signal addressed to itself, transmits it to the controller 50 for processing it according to a program. When the transmitted signal comes back on the ring-shaped transmission line, the transceiver station 57 erases it from the transmission line and transmits a token.

When the host computer 62 is monitoring a certain particular memory content, for example, of the controller 51, the address, the transmission channel and the control word are transmitted to the transfer control station 61, for example, in the following format:

: 08 01 Control Command Check Code CR

When this signal is received, the transfer control station 61 proceeds to catch the token traveling around on the transmission line and, when it is caught, converts it into a busy token so as to deny the right to transmit from the other stations. Thereafter, the re-edited control command may be transmitted in the following format:

7E 08 0510 Control Command CRC1 CRC2 7E

The transceiver station 56, upon receiving the data signal addressed to itself, accepts it and reads the specified memory content. In the meantime, the transfer control station 61, when the transmitted data signal comes back on the transmission line, erases it and transmits a free token. When the preparation for transmission is completed, the transceiver station 56 proceeds to catch the token circling around on the transmission line and, upon catching it, converts it to a busy token, thereby denying the right to transmit from the other stations. Thereafter, a response is given to the host computer 62 in the following format:

7E 0501 08 Data CRC1 CRC2 7E

At this point, when the transfer control station 61 receives the data signal addressed to itself, it understands on the basis of the address content that it is addressed to CH.1 and transmits the data to the host computer 62 by editing the data into the following format:

: 01 08 Data Check Code CR

When this data signal is received, the host computer 62 recognizes that it is a response from the programmable controller 51 (#4) and processes the data according to the control command transmitted earlier. As for the transceiver station 56, when the transmitted data signal returns on the transmission line, it erases the signal and transmits a free token. In the meantime, the monitoring station 60 keep monitoring the signals on the transmission line, checking whether there is any abnormality in the signals and whether the token makes a round trip within a prescribed period. If an abnormal situation is detected, restoration is started immediately.

Networks of the type described above need not be used singly. Where there are many systems to be managed from a center, for example, it is desirable to combine a plurality of such networks. A method of combining such networks according to the present invention is illustrated in FIG. 11 wherein two networks having identical functions are connected. Numeral 110 individually indicates a programmable controller (PC) each connected to a transceiver station (T) 111. Numerals 112 and 112' are transfer control stations with a structure shown for example in FIG. 10. Numeral 113 indicates a host computer (#). The computers are connected as shown to ring-shaped transmission lines 114 made of optical fibers. The transfer control stations 112' of the two networks are connected by another transmission line 115 by making use of the standard interface means shown in FIG. 10.

Within the networks thus linked together, not only can data be exchanged between programmable controllers but all controllers can be controlled by the host computers. Communications are also made possible by connecting other devices to the transfer control stations 112 such as a CRT, a printer or a bar code reader. When a data signal is exchanged between the networks through the transmission line 115 between the transfer control stations 112', communication is easier than if it is done through the computers 113.

Although a situation where both networks use the same communication means was described above, different communication means may be used if, for example, the computers 113 are connected together by a converter adapted to convert transmission formats, transmission speeds and transmission procedures.

In the explanation above of the present invention, delays which occur, for example, when a free token is converted into a busy token, were ignored for the sake of convenience. Even if the delay at each station may be small when such a conversion takes place, the total delay may be significantly large if the network contains a large number of stations and this can affect the transmission efficiency adversely. In view of this, the present invention provides a method whereby a token can be captured and released by a station without a delay.

An example of system composition using this method is illustrated in FIG. 12 wherein letters A, B, C, D and E each represent a station and letter T represents a delay means for containing the token and may comprise a shift register with memory capacity of one token. Each station is provided as shown with AND gates adapted to open and close the ring-shaped transmission path in response to a RING CUT signal.

FIGS. 13(a) and 13(b) show in detail a message (data) format and token format used by this method. FIG. 13(A) shows an SDLC/HDLC message (data) format which includes an open flag, an address, a data field, a first cycle redundancy check (CRC #1), a second cycle redundancy check (CRC #2) and a close flag. FIG. 13(b) shows a token format which includes an open flag, a token address, CRC #1, CRC #2 and a close flag.

The basic operation of the method is now explained with reference to FIGS. 14(a), (b), (c) and (d). A free token FT propagates from the delay T along the loop and comes back to the delay T (FIG. 14(a)). When two stations A and B requesting the right to transmit receive the free token, they both cut the transmission path by their individual opening/closing means a and b, and issue an abort signal AB to invalidate any free token on the down stream side (FIG. 14(b)). The abort signal AB transmitted by the station A causes the station B to reconnect the transmission path which has been cut by the opening/closing means b. Thus, the right to transmit is given to the station A which was able to receive the free token till the end and a data packet PA is transmitted from the station A (FIG. 14(c)). After the packet PA is transmitted, the station A closes the transmission path by its opening/closing means a and releases the free token FT (FIG. 14(d)).

In summary, the station requesting the right to transmit cuts the transmission path to capture the free token and simultaneously transmits an abort signal in the downstream direction so as to invalidate down stream free tokens. The right to transmit is thereby captured and after the packet PA is transmitted, the free token can be released by closing the transmission path. In other words, each station can capture and release the token immediately by the operation of a path opening/closing means without converting the free token into a busy token. This method is advantageous firstly because the token and data transmission efficiency can remain high since there are no delays at the stations. Even in the case of a multi-bit token including a bit error detection symbol or the like, delays at the stations can be minimized by this method. Another advantage is that it can be used with inexpensive commercially available general-purpose LSI. Other advantages are that data transmission after receiving the token can be accomplished quickly and that processing can be achieved within a fixed service time independent of the number of connected stations.

The number of data packets which are transmitted at one time from a transceiver station is usually limited but it is not necessarily one. When a relatively large number of data packets are stored in a transceiver station, they are sent out in the order in which they came to the station, or according to their storage sequence. When a data packet of higher importance, or of higher priority, is behind less important data packets, therefore, its transmission may be delayed even if the station where it is stored obtains the right to transmit. There is shown in FIGS. 15 and 16 an improved data transmission method of the present invention whereby a high-priority packet is attached to and transmitted together with the packet which is uniquely selected for transmission so that the service time can be significantly reduced. The circuit structure of a transceiver station used for this system is shown in FIG. 16.

FIG. 15 shows an network with stations 121 through 126 connected by a transmission line 127 of optical fiber, etc. into a ring-like formation. Numeral 128 represents an ordinary communication packet with 512 bits. Numeral 138 represents a high-priority packet and numerals 139 and 140 are buffer memories at the station 121. Although not shown, it is to be understood that each station is similarly structured with a first buffer memory for storing low-priority packets such as program commands and control languages and a second buffer memory for storing high-priority packets. In FIG. 16 wherein components corresponding to those in FIG. 15 are assigned like numerals, numerals 130 and 131 are each an interface means, numerals 132 and 133 are each a data transmission bus, numeral 134 is a network control circuit (CONT), numeral 136 is a CPU for the station control and numeral 137 is an internal multi-bus which connects the aforementioned two buffer memories (MEM) 139 and 140 with the network control circuit 134 and the CPU 136. The buffer memories 139 and 140 are adapted to store packets in the order in which they arrived.

When the station 121 captures the token, the packet 128 which first came to the first buffer memory 139 is selected uniquely and sent out onto the transmission line 127. In this situation, if there is one or more high-priority packets stored in the second buffer memory 140, the packet 138 which first came to be stored in this buffer memory is selected, attached either in front of or behind the low-priority packet 128 and sent out simultaneously together onto the transmission line 127. In short, various data for different protocols can be supplied simultaneously according to the method of this invention and the service time required by this network is nearly the same as for a single network.

FIG. 17 shows an example of network of programmable controllers making use of the aforementioned data transmission method wherein TCU represents a terminal communication unit, PNU indicates a programmable controller network unit, PC is a programmable controller, and they are connected as shown by transmission lines such as optical fibers. DTE represents a terminal unit such as a CRT and a bar code or a computer. CPA and DPA are respectively a computer link packet and a data link packet. If a high-priority DPA is present, it can be attached to a CPA so that they can be transmitted simultaneously. Although use of two separate memory buffers was disclosed, it is also to be considered within the scope of this invention if only one memory buffer is used in such a way that high-priority and low-priority packets are separately stored therein. The network efficiency can be further improved if the network is so structured that not only a high-priority packet stored at a station having the right to transmit but a packet at a station without the right to transmit can also be attached to a lower-priority packet when the latter passes through the station where it is stored.

What is claimed is:

1. In a data transmission system comprising mutually connected stations, each of said stations being adapted to receive arriving data packets and to transmit said data packets normally in the order in which said data packets are received, the improvement wherein each of said stations includes means for distinguishing high-priority data packets from normal-priority packets, each of said stations being adapted to separately store high-priority and normal-priority data packets which have been received and to attach one of said high-priority data packets, if there is one stored therein, to the next-to-be-transmitted normal-priority data packet which is one of said stored normal-priority data packets and is to be transmitted next according to the order in which said normal-priority data packets have been received and to transmit said one of said high-priority data and said next-to-be-transmitted normal-priority data packet simultaneously.

2. The data transmission system of claim 1 wherein said stations are connected together to form a ring-shaped network.

3. The data transmission system of claim 1 wherein each of said stations include a first buffer memory for storing said normal-priority data packets and a second buffer memory for storing said high-priority data packets.

4. The data transmission system of claim 1 wherein said one of said high-priority data packets is the one that was received first among said high-priority data packets.

5. The data transmission system of claim 1 wherein said one of said high-priority data packets and said next-to-be transmitted normal-priority data packets are attached together when transmitted simultaneously.

* * * * *